(12) United States Patent
Iwasaki et al.

(10) Patent No.: US 10,065,585 B2
(45) Date of Patent: Sep. 4, 2018

(54) VEHICLE POWER SUPPLY SYSTEM

(71) Applicant: Panasonic Intellectual Property Management Co., Ltd., Osaka (JP)

(72) Inventors: Naoya Iwasaki, Osaka (JP); Yoshihiko Maeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 143 days.

(21) Appl. No.: 15/316,644

(22) PCT Filed: Jul. 7, 2015

(86) PCT No.: PCT/JP2015/003399
§ 371 (c)(1),
(2) Date: Dec. 6, 2016

(87) PCT Pub. No.: WO2016/009614
PCT Pub. Date: Jan. 21, 2016

(65) Prior Publication Data
US 2017/0197567 A1    Jul. 13, 2017

(30) Foreign Application Priority Data
Jul. 17, 2014    (JP) .................. 2014-146442

(51) Int. Cl.
*B60R 16/033*    (2006.01)
*F02N 11/08*    (2006.01)
*H02J 7/00*    (2006.01)
*B60R 16/00*    (2006.01)

(52) U.S. Cl.
CPC .......... *B60R 16/033* (2013.01); *B60R 16/005* (2013.01); *F02N 11/087* (2013.01); *H02J 7/0065* (2013.01); *H02J 2007/0067* (2013.01)

(58) Field of Classification Search
CPC ........ B60R 16/033; F02N 11/087; H02J 1/10; H02J 7/0065; H02J 2007/0067
USPC ........................................... 307/10.6
See application file for complete search history.

(56) References Cited

U.S. PATENT DOCUMENTS

| | | | |
|---|---|---|---|
| 6,909,201 B2 * | 6/2005 | Murty ................ | H02J 7/1423 307/10.1 |
| 9,108,633 B1 * | 8/2015 | Atluri ................ | B60W 20/10 |
| 9,797,361 B2 * | 10/2017 | Shibachi ............ | F02N 11/0866 |
| 9,843,184 B2 * | 12/2017 | Origane ............. | H02J 1/08 |
| 9,868,410 B2 * | 1/2018 | Namuduri ........... | F02N 11/08 |

(Continued)

FOREIGN PATENT DOCUMENTS

| | | |
|---|---|---|
| JP | 2004-190626 | 7/2004 |
| JP | 2004-338577 | 12/2004 |

OTHER PUBLICATIONS

International Search Report of PCT application No. PCT/JP2015/003399 dated Sep. 29, 2015.

*Primary Examiner* — Levi Gannon
(74) *Attorney, Agent, or Firm* — Pearne & Gordon LLP

(57) ABSTRACT

A vehicle power supply system has a first switch, a second switch, a third switch, a fourth switch, a fifth switch, a sixth switch, a DC-DC converter, and a controller. In a case where power is supplied to both of a starter and an electrical component from any one of a first battery and a second battery, the controller causes power to be supplied to the electrical component via the DC-DC converter.

4 Claims, 6 Drawing Sheets

(56) References Cited

U.S. PATENT DOCUMENTS

| | | | |
|---|---|---|---|
| 2003/0160510 A1* | 8/2003 | Mizutani | F02N 11/0814 |
| | | | 307/10.1 |
| 2005/0035656 A1 | 2/2005 | Kuramochi et al. | |
| 2016/0137092 A1* | 5/2016 | Thieme | B60L 11/1861 |
| | | | 307/10.6 |
| 2016/0185225 A1* | 6/2016 | Namuduri | B60L 1/003 |
| | | | 701/22 |
| 2017/0022955 A1* | 1/2017 | Steele | F02N 11/0866 |
| 2017/0106758 A1* | 4/2017 | Sakatani | B60L 11/18 |
| 2017/0197565 A1* | 7/2017 | Yoneyama | B60R 16/0231 |
| 2018/0041048 A1* | 2/2018 | Yang | B60R 16/033 |

\* cited by examiner

FIG. 6

| STATE/RELAY | RELAY 21 | RELAY 22 | RELAY 23 | RELAY 24 | RELAY 25 | RELAY 26 |
|---|---|---|---|---|---|---|
| NORMAL (USUAL TIME) | ON | ON | OFF | ON | OFF | ON |
| Pb ABNORMALITY | OFF | ON | OFF | ON | OFF | ON |
| Li ABNORMALITY | ON | OFF | ON | ON | OFF | ON |
| DC-DC ABNORMALITY | ON | ON | OFF | ON | ON | OFF |
| RELAY 23 SHORT-CIRCUIT | ON | ON | - | OFF | OFF | ON |
| RELAY 24 SHORT-CIRCUIT | ON | ON | OFF | - | OFF | ON |
| RELAY 25 SHORT-CIRCUIT | ON | ON | OFF | ON | - | ON |
| RELAY 26 SHORT-CIRCUIT | ON | ON | OFF | ON | OFF | - |

VEHICLE POWER SUPPLY SYSTEM

TECHNICAL FIELD

The present invention relates to a vehicle power supply system used in a vehicle such as an automobile.

BACKGROUND ART

A related art in which a plurality of secondary batteries of which features are different from each other are mounted and a secondary battery to supply power is selected by a relay is known.

For example, in PTL 1, a lithium-ion battery and a lead storage battery are mounted in a vehicle, power of the lead storage battery is supplied to a starter via a relay at a time of usual start, and power of the lithium-ion battery is supplied to the starter via the relay at a time of restart after an idling stop.

In addition, in PTL 1, power generated from an alternator is supplied to the lead battery and a vehicle auxiliary device during a usual traveling, and power is supplied from the lithium-ion battery to the vehicle auxiliary device and the like during the idling stop.

Currently, the reliability of power supply to an electrical component (camera, laser sensor, or the like) is required under the circumstances where the computerization and motorization of a vehicle or the self-driving and obstacle detection of a vehicle are adopted.

As a method for maintaining power supply at a time of abnormality, for example, a plurality of power sources are connected to one load and each of a plurality of loads is connected to one power source in a configuration disclosed in PTL 2. Therefore, the power sources and the loads are electrically disconnected under a predetermined condition.

In PTL 2, continuously maintaining power supply with respect to a load in a different system in which a fault has not occurred is possible even in a case of a failure of the power source and a ground fault or a disconnection of a power supply line.

CITATION LIST

Patent Literature

PTL 1: Japanese Patent Unexamined Publication No. 2004-190626
PTL 2: Japanese Patent Unexamined Publication No. 2004-338577

SUMMARY OF THE INVENTION

The present invention provides a vehicle power supply system which has a high reliability of power supply to a plurality of loads (for example, an electrical component and a starter).

The vehicle power supply system of the present invention has a first switch, a second switch, a third switch, a fourth switch, a fifth switch, a sixth switch, a DC-DC converter, and a controller. The first switch is provided on a first power supply line for supplying power from a first battery which can supply power to the starter and the electrical component. The second switch is provided on a second power supply line for supplying power from a second battery which can supply power to the starter and the electrical component. The third switch is provided on a third power supply line which is connected to the first power supply line and which is for supplying power to the starter. The fourth switch is provided on a fourth power supply line which is connected to the second power supply line and the third power supply line. The fifth switch is provided on a fifth power supply line which is connected to the first power supply line and which is for supplying power to the electrical component. The sixth switch is provided on a sixth power supply line which is connected to the second power supply line and the fifth power supply line. The DC-DC converter is provided on the fifth power supply line or the sixth power supply line. The controller controls the first switch to the sixth switch and the DC-DC converter. The controller causes power to be supplied to the electrical component via the DC-DC converter in a case where power is supplied to both of the starter and the electrical component from any one of the first battery and the second battery.

According to the above configuration, the reliability of power supply to the plurality of loads (for example, the electrical component and the starter) can be improved.

BRIEF DESCRIPTION OF DRAWINGS

FIG. 6 is a view illustrating states of batteries and relays and whether each relay is turned on or off in each state in vehicle power supply system 1 shown in FIG. 1.

DESCRIPTION OF EMBODIMENT

Before explaining an embodiment of the present invention, problems of the vehicle power supply system in the related art will be briefly described. An electrical component and an engine starter are mainly considered as power supply destinations for the vehicle power supply system.

As described above, under the circumstances where the self-driving and obstacle detection of the vehicle are adopted, the reliability of power supply to the electrical component is required. In addition, a system in which a stop and a restart of an engine are frequently carried out during traveling, such as coasting and fuel-efficient driving systems, is proposed, and thus the reliability of power supply to the starter is required to ensure that the engine is reliably restarted.

In a case where power is supplied to the electrical component and the engine is started by the starter, the reliability is required when power is supplied to both of the starter and the electrical component since a high current is supplied to the starter, a battery voltage declines rapidly (instantaneous voltage drop), and malfunction and an operation stop of the electrical component might occur.

However, in the configuration described in PTL 2, continuous power supply to the load in the different system in which a fault has not occurred is maintained. That is, power supply to the plurality of loads (for example, the electrical component and the starter) cannot be maintained.

Hereinafter, the embodiment of the present invention will be described in detail with reference to the drawings.

However, the following embodiment is to describe a vehicle power supply system as an example which embodies a technical concept of the present invention, and is not intended to limit the present invention to this vehicle power supply system. Accordingly, without departing from the technical concept of the present invention, the present invention can be equally applied to other vehicle power supply systems.

Figure 1:
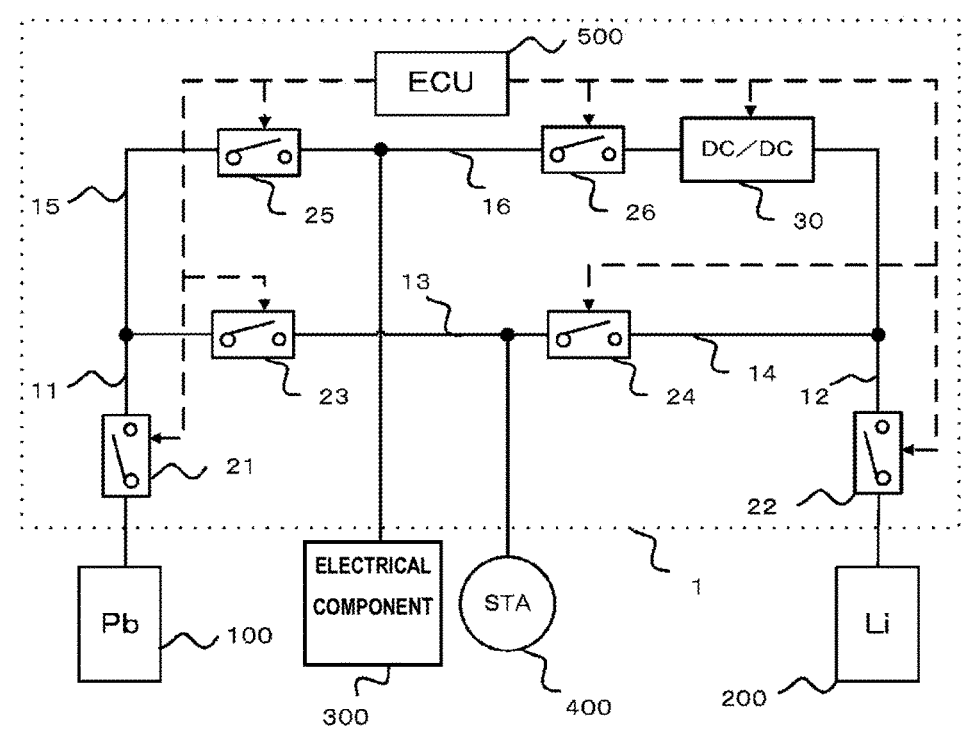
FIG. 1 is a view illustrating a configuration of a vehicle power supply system according to an embodiment of the present invention.

First, a configuration of vehicle power supply system 1 according to the present embodiment will be described with reference to FIG. 1. FIG. 1 is a view illustrating the configuration of vehicle power supply system 1 according to the embodiment of the present invention. A solid line and a dashed line indicate a power supply line and a signal line respectively.

Vehicle power supply system 1 supplies power from lead battery 100 (first battery) and/or lithium-ion battery 200 (second battery) to electrical component 300 and starter 400.

Lead battery 100 and lithium-ion battery 200 have nearly the same voltage, and it is possible to supply power to electrical component 300 and starter 400 even in a case where one of lead battery 100 and lithium-ion battery 200 fails.

Electrical component 300 is, for example, a car navigation system, a camera, a laser sensor, or the like, and since electrical component 300 is used as a part of a sensing function at a time of self-driving of a vehicle in the present embodiment, electrical component 300 will be described as a component of which malfunction or an operation stop is not acceptable.

Starter 400 starts an engine mounted in the vehicle, and is configured of, for example, a motor-generator or a belt-driven starter generator.

Next, an internal configuration of vehicle power supply system 1 will be described.

Vehicle power supply system 1 is configured with power supply lines 11 to 16, relays 21 to 26 (first switch to sixth switch), DC-DC converter 30, and electrical control unit (ECU) 500 that controls the above.

Power supply line 11 is connected to lead battery 100 and transmits power from lead battery 100. Relay 21 is provided on power supply line 11.

Power supply line 12 is connected to lithium-ion battery 200 and transmits power from lithium-ion battery 200. Relay 22 is provided on power supply line 12.

Power supply line 13 is connected to power supply line 11 and is also connected to a power supply line to starter 400. Relay 23 is provided on power supply line 13.

Power supply line 14 is connected to power supply line 12 and is also connected to power supply line 13 (power supply line to starter 400). Relay 24 is provided on power supply line 14.

Power supply line 15 is connected to power supply line 11 and is also connected to a power supply line to electrical component 300. Relay 25 is provided on power supply line 15.

Power supply line 16 is connected to power supply line 12 and is also connected to power supply line 15 (power supply line to electrical component 300). Relay 26 is provided on power supply line 16.

DC-DC converter 30 is provided on power supply line 16 and changes (steps up or steps down) a voltage of input power in order to output the power to electrical component 300.

Figure 2:
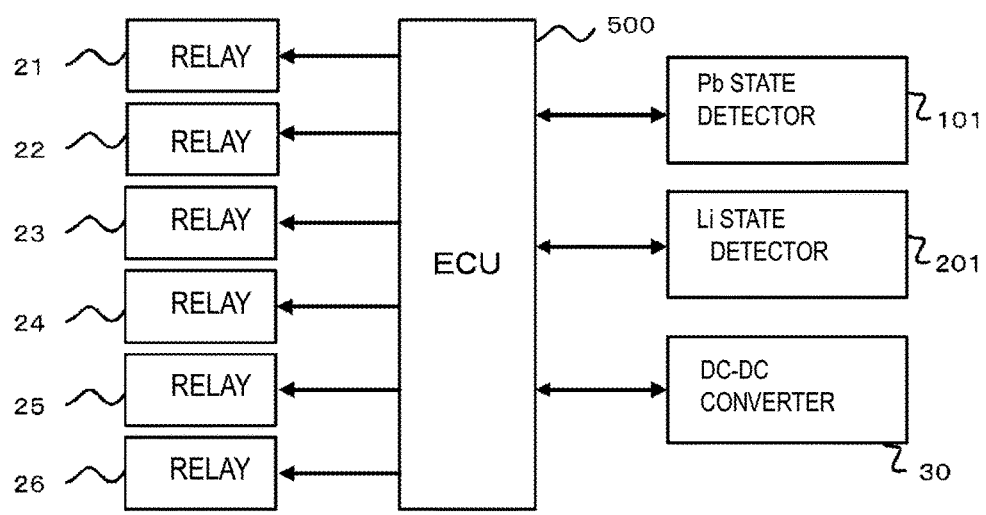
FIG. 2 is a block diagram illustrating an ECU of the vehicle power supply system shown in FIG. 1.

Next, ECU 500 will be described with reference to FIG. 2. FIG. 2 is a block diagram illustrating ECU 500.

Lead battery state detector 101 monitors a state of lead battery 100 and notifies ECU 500 of the state of lead battery 100.

Lithium-ion battery state detector 201 monitors a state of lithium-ion battery 200 and notifies ECU 500 of the state of lithium-ion battery 200. In FIG. 2, lead battery state detector 101 and lithium-ion battery state detector 201 are indicated by Pb state detector 101 and Li state detector 201 respectively.

ECU 500 controls relays 21 to 26 and DC-DC converter 30 based on the states of lead battery 100 and lithium-ion battery 200 and the like.

Next, an operation of vehicle power supply system 1 at a time of normal operation will be described with reference to FIG. 3.

At the time of normal operation (in a case where no abnormality is found in lithium-ion battery 200 and the like), ECU 500 turns relay 22, relay 24, and relay 26 on and drives DC-DC converter 30.

Figure 3:
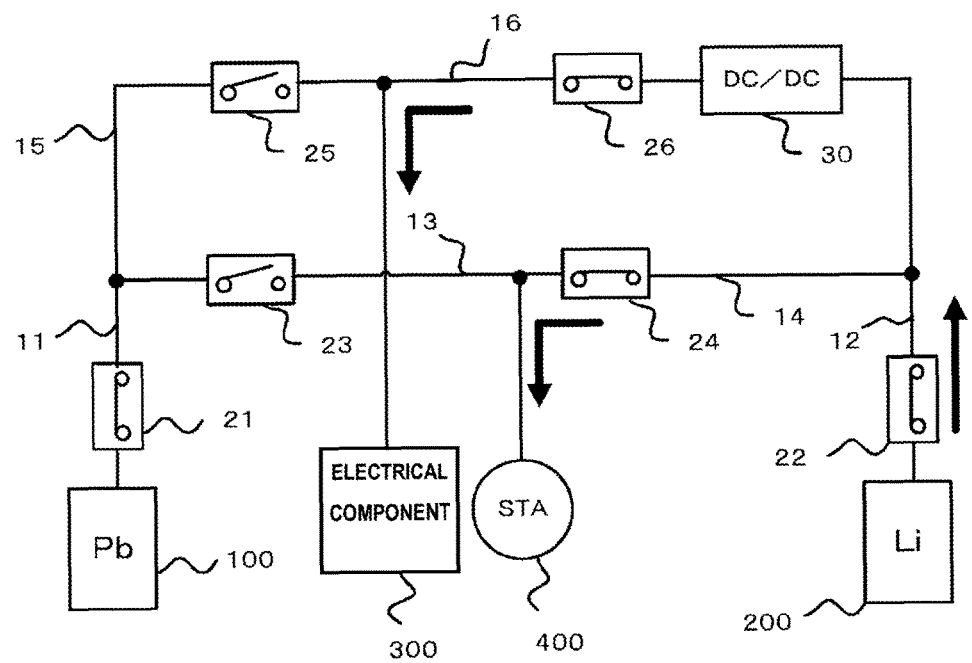
FIG. 3 is a view illustrating an operation of the vehicle power supply system shown in FIG. 1 at a time of normal operation.

Accordingly, power is supplied from lithium-ion battery 200 to electrical component 300 and starter 400 as shown by arrows in FIG. 3.

Since increasing the depth of charge and the depth of discharge of lead battery 100 has a large impact on battery life, the reliability of power supply to electrical component 300 and starter 400 is improved by supplying power from lithium-ion battery 200 at the time of normal operation.

In addition, power is supplied to electrical component 300 via DC-DC converter 30. Accordingly, even in a case where a high current has been supplied to starter 400 and a voltage has decreased temporarily, it is possible to prevent malfunction or an operation stop of electrical component 300 since power is supplied to electrical component 300 after the voltage has been stepped up to an appropriate level by DC-DC converter 30.

Next, an operation of vehicle power supply system 1 in a case where an abnormality has occurred in lithium-ion battery 200 will be described with reference to FIG. 4.

In a case where an abnormality has occurred in lithium-ion battery 200, ECU 500 turns relay 22 off and relay 21, relay 23, relay 24, and relay 26 on, and drives DC-DC converter 30.

Figure 4:
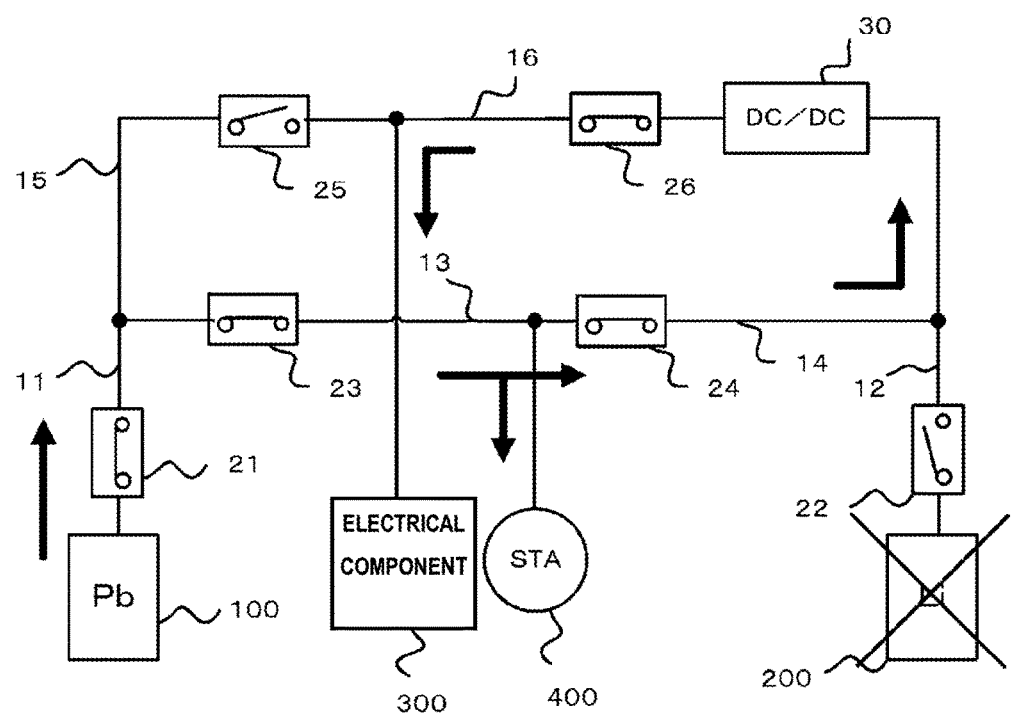
FIG. 4 is a view illustrating an operation in a case where a lithium-ion battery has failed in vehicle power supply system 1 shown in FIG. 1.

Accordingly, power is supplied from lead battery 100 to electrical component 300 and starter 400 as shown by arrows in FIG. 4.

Even in a case where a high current has been supplied to starter 400 and a voltage has decreased temporarily as a result of supplying power to electrical component 300 via DC-DC converter 30 when power is supplied from lead battery 100 to electrical component 300 and starter 400, it is possible to prevent malfunction or an operation stop of electrical component 300 since power is supplied to electrical component 300 after the voltage has been stepped up to an appropriate level by DC-DC converter 30.

That is, controlling each relay as in FIG. 4 allows stably supplying power to electrical component 300 and starter 400 even in a case where an abnormality has occurred in lithium-ion battery 200 and lithium-ion battery 200 has failed.

In addition, turning relay 23, relay 24, and relay 26 on and inputting power to DC-DC converter 30 via power supply line 13, power supply line 14, and power supply line 16 allow changing a voltage to an appropriate level with one DC-DC converter 30 without providing each of batteries with DC-DC converter 30. Accordingly, a rise in cost and an increase in the size of the system can be prevented.

Next, an operation of vehicle power supply system 1 in a case where an abnormality has occurred in DC-DC converter 30 will be described with reference to FIG. 5.

In a case where an abnormality has occurred in DC-DC converter 30, DC-DC converter 30 cannot change a voltage. Accordingly, in a case where power is supplied from one of lead battery 100 and lithium-ion battery 200 to both of electrical component 300 and starter 400, malfunction or an operation stop of electrical component 300 might occur.

Therefore, in a case where an abnormality has occurred in DC-DC converter 30, power is supplied from each of the two different batteries to electrical component 300 and starter 400 respectively.

Figure 5:
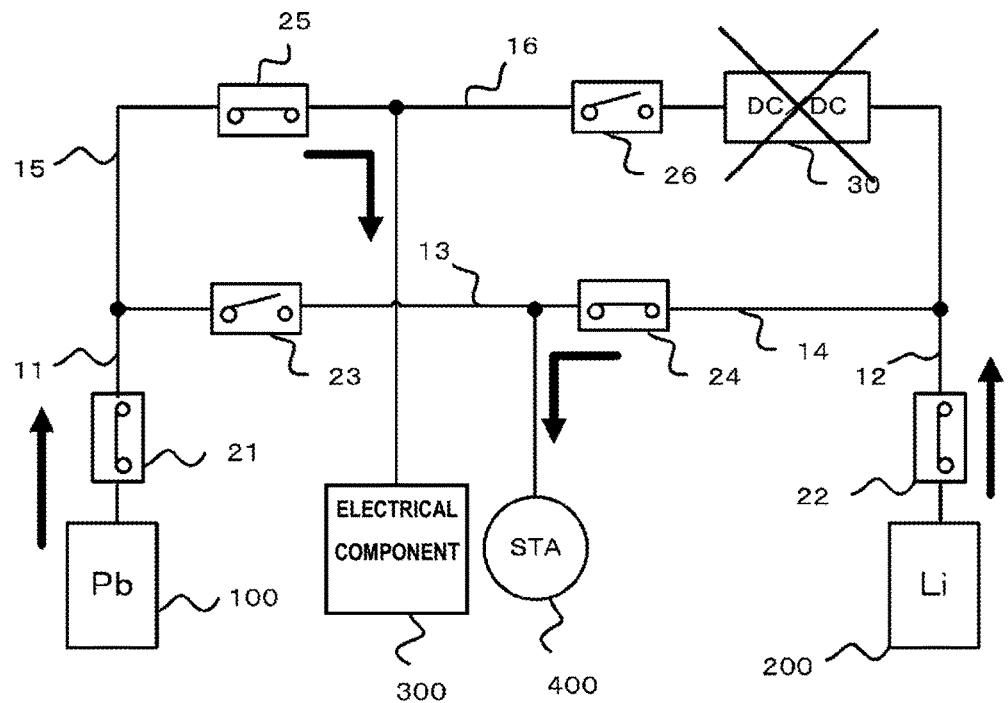
FIG. 5 is a view illustrating an operation in a case where an abnormality has occurred in a DC-DC converter in vehicle power supply system 1 shown in FIG. 1.

FIG. 5 illustrates a case where power is supplied from lead battery 100 to electrical component 300 and power is supplied from lithium-ion battery 200 to starter 400.

In a case where an abnormality has occurred in DC-DC converter 30, ECU 500 turns relay 23 and relay 26 off and turns relay 21, relay 22, relay 24, and relay 25 on.

Accordingly, power is supplied from lead battery 100 to electrical component 300, and power is supplied from lithium-ion battery 200 to starter 400 as shown by arrows in FIG. 5.

Accordingly, even in a case where a voltage of a battery that supplies power to starter 400 has decreased temporarily, malfunction or an operation stop of electrical component 300 can be prevented without supply of power to electrical component 300 being affected.

FIG. 6 illustrates states of batteries and relays and whether each relay is turned on or off in each state.

As described above, ECU 500 turns relay 22, relay 24, and relay 26 on, turns relay 23 and relay 25 off, and supplies power from lithium-ion battery 200 to electrical component 300 and starter 400 at the time of normal operation.

In addition, in a case where lead battery 100 has failed, ECU 500 turns relay 21, relay 23, and relay 25 off, and turns relay 22, relay 24, and relay 26 on, and supplies power from lithium-ion battery 200 to electrical component 300 and starter 400.

In a case where lithium-ion battery 200 has failed, ECU 500 turns relay 22 and relay 25 off and relay 21, relay 23, relay 24, and relay 26 on, and supplies power from lead battery 100 to electrical component 300 and starter 400.

In a case where an abnormality has occurred in DC-DC converter 30, ECU 500 turns relay 23 and relay 26 off, turns relay 21, relay 22, relay 24, and relay 25 on, supplies power from lead battery 100 to electrical component 300, and supplies power from lithium-ion battery 200 to starter 400.

In a case where relay welding or the like has brought relay 23 into a short-circuit state, relay 24 and relay 25 are turned off, relay 21, relay 22, and relay 26 are turned on, power is supplied from lead battery 100 to starter 400, and power is supplied from lithium-ion battery 200 to electrical component 300.

In a case where relay welding or the like has brought relay 24 into a short-circuit state, relay 23 and relay 25 are turned off, relay 21, relay 22, and relay 26 are turned on, and power is supplied from lithium-ion battery 200 to electrical component 300 and starter 400. Power is supplied to electrical component 300 via DC-DC converter 30.

In a case where relay welding or the like has brought relay 25 into a short-circuit state, relay 23 is turned off, relay 21, relay 22, relay 24, and relay 26 are turned on, power is supplied from lead battery 100 to electrical component 300, and power is supplied from lithium-ion battery 200 to starter 400. The reason why relay 26 is turned on is to ensure that power supply to electrical component 300 does not get stopped in a case where relay 25 suddenly returns to normal after the short-circuit state.

In a case where relay welding or the like has brought relay 26 into a short-circuit state, relay 23 and relay 25 are turned off, relay 21, relay 22, and relay 24 are turned on, and power is supplied from lithium-ion battery 200 to electrical component 300 and starter 400. Power is supplied to electrical component 300 via DC-DC converter 30. In a case where relay 26 has suddenly returned to normal after the short-circuit state, relay 25 may be turned on to ensure that power supply to electrical component 300 does not get stopped.

The description of FIG. 6 is merely an example. In a case where power is supplied to both of electrical component 300 and starter 400 from one battery, relay control may be carried out in a different manner insofar as a condition in which power is supplied to electrical component 300 via DC-DC converter 30 is satisfied.

As described above, in the embodiment, in a case where power is supplied to both of electrical component 300 and starter 400 from one battery, power is supplied to electrical component 300 via DC-DC converter 30. Accordingly, even in a case where any one of batteries has failed, power can be stably supplied to both of electrical component 300 and starter 400.

In addition, DC-DC converter 30 is provided on power supply line 16. That is, power is received from lead battery 100 and lithium-ion battery 200, and lead battery 100 and lithium-ion battery 200 are provided at positions that allow supplying power to electrical component 300. Therefore, changing a voltage of power from lead battery 100 and a voltage of power from lithium-ion battery 200 with one DC-DC converter 30 becomes possible by switching power supply lines through relay control, and thus a DC-DC converter is not required to be provided for each battery.

Without being limited to the aforementioned example, various modifications can be made.

For example, in the above description, power is supplied to both of electrical component 300 and starter 400 from lithium-ion battery 200 at the time of normal operation. However, without being limited thereto, for example, power may be supplied from lead battery 100 to electrical component 300 and power may be supplied from lithium-ion battery 200 to starter 400 as in FIG. 5.

In addition, in the above description, DC-DC converter 30 is provided on power supply line 16 to supply power from lithium-ion battery 200 to electrical component 300 and starter 400 at the time of normal operation. In addition to this, for example, DC-DC converter 30 may be provided on power supply line 15 in a case where power is supplied from lead battery 100 to electrical component 300 and starter 400 at the time of normal operation.

In addition, although only relays have been described above, it is preferable to dispose a diode of the direction to electrical component 300 in parallel with relay 25 and relay 26. Accordingly, for example, even in a case where lithium-ion battery 200 has failed in the middle of supplying power from lithium-ion battery 200 to electrical component 300 and starter 400, power can be supplied to electrical component 300 before turning a relay on/off. Accordingly, an operation stop of electrical component 300 can be prevented. When a configuration in which power is supplied from lithium-ion battery 200 to electrical component 300 is adopted at the time of normal operation, the diode may be disposed in parallel with only relay 25.

In addition, it is possible to determine a supply destination (battery) for generated power by controlling relay 23 and relay 24 based on battery residual charge (remaining capacity) or the like in a case where starter 400 also functions as a generator such as a belt alternator starter.

In addition, although an example of a combination of lead battery 100 and lithium-ion battery 200 has been given in the above description, for example, a combination of a lead battery and a nickel-hydride battery, a combination of a lithium-ion battery and a nickel-hydride battery, and a combination of a lead battery and a lead battery may be adopted instead.

In addition, although relays have been given as an example of a switch, for example, a semiconductor switch such as a transistor and an FET may be adopted instead.

In addition, although lead battery 100 and lithium-ion battery 200 have nearly the same voltage in the above description, battery voltages may be different from each other. For example, a battery voltage of lead battery 100 may be 12V and a battery voltage of lithium-ion battery 200 may be 16V. In this case, when supplying power from lithium-ion battery 200 to electrical component 300, the voltage is stepped down by DC-DC converter 30 to 12V and then power is supplied. It is preferable that battery voltages of lead battery 100 and lithium-ion battery 200 are within a range of 9V to 16V which correspond to voltages of electrical components.

In addition, lead battery 100 and lithium-ion battery 200 may be combined and configured as vehicle power supply system 1.

The vehicle power supply system of the present invention is useful in stably supplying power to both of the electrical component and the starter.

The invention claimed is:

1. A vehicle power supply system comprising:
    a first switch provided on a first power supply line for supplying power from a first battery which can supply power to a starter and an electrical component;
    a second switch provided on a second power supply line for supplying power from a second battery which can supply power to the starter and the electrical component;
    a third switch provided on a third power supply line which is connected to the first power supply line and is for supplying power to the starter;
    a fourth switch provided on a fourth power supply line which is connected to the second power supply line and the third power supply line;
    a fifth switch provided on a fifth power supply line which is connected to the first power supply line and is for supplying power to the electrical component;
    a sixth switch provided on a sixth power supply line which is connected to the second power supply line and the fifth power supply line;
    a DC-DC converter provided on the fifth power supply line or the sixth power supply line; and
    a controller that controls the first switch, the second switch, the third switch, the fourth switch, the fifth switch, the sixth switch, and the DC-DC converter,
    wherein the controller causes power to be supplied to the electrical component via the DC-DC converter in a case where power is supplied to both of the starter and the electrical component from any one of the first battery and the second battery.

2. The vehicle power supply system of claim 1,
    wherein, in a case where power is supplied to the electrical component from any one of the first battery and the second battery without going through the DC-DC converter, the controller causes power to be supplied to the starter from one of the first battery and the second battery, which is not supplying power to the electrical component.

3. The vehicle power supply system of claim 1, further comprising:
    the first battery; and
    the second battery.

4. The vehicle power supply system of claim 1,
    wherein the first battery is a lead battery,
    the second battery is a lithium-ion battery,
    the DC-DC converter is provided on the sixth power supply line, and
    the controller causes power to be supplied from the second battery to both of the starter and the electrical component and causes power to be supplied to the electrical component via the DC-DC converter at a time of normal operation.

* * * * *